March 6, 1962
C. W. STUMP, JR
3,024,189
METHOD OF AND APPARATUS FOR PURIFYING SEWAGE
Filed July 30, 1958
3 Sheets-Sheet 3
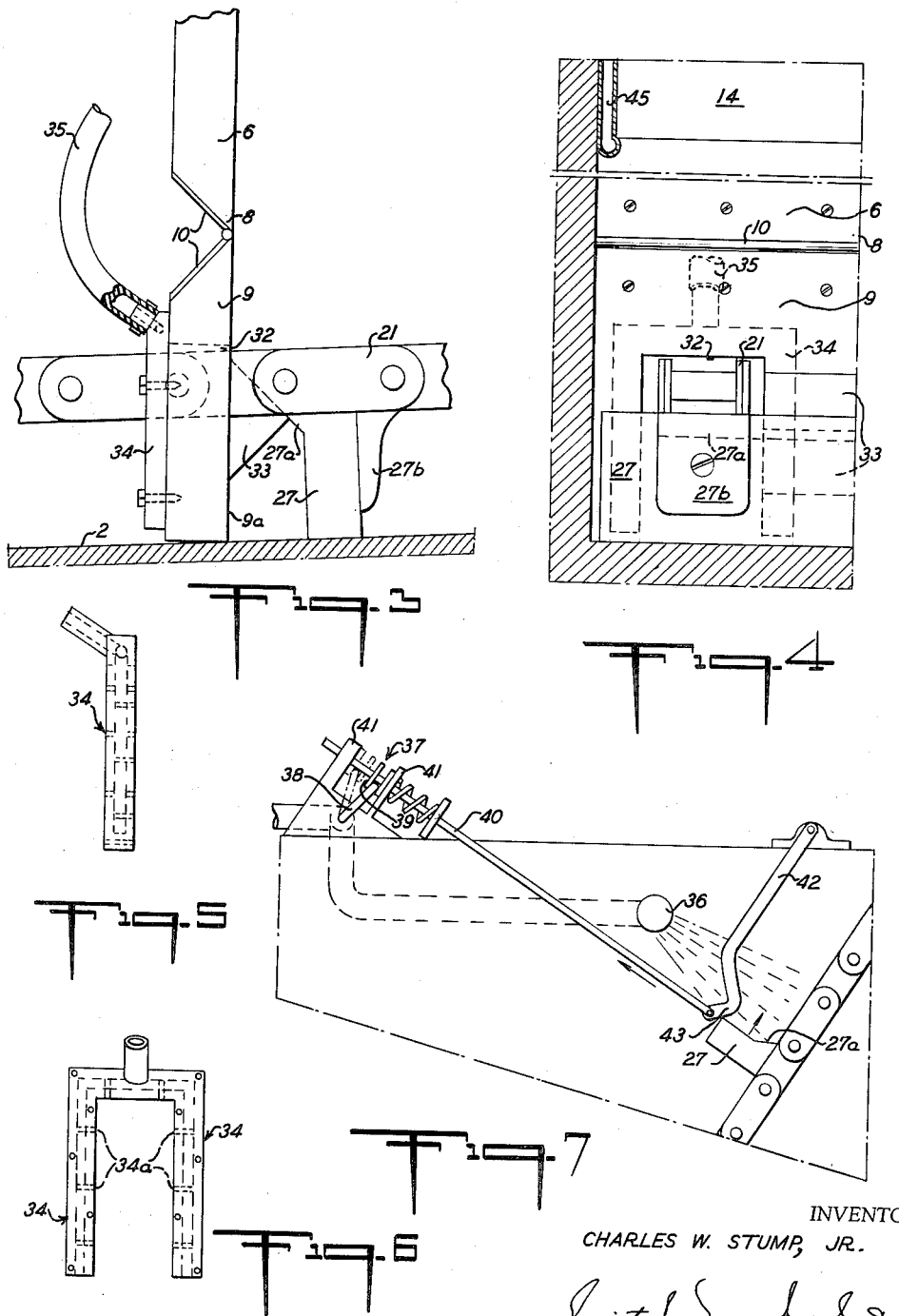
INVENTOR
CHARLES W. STUMP, JR.
BY
ATTORNEYS

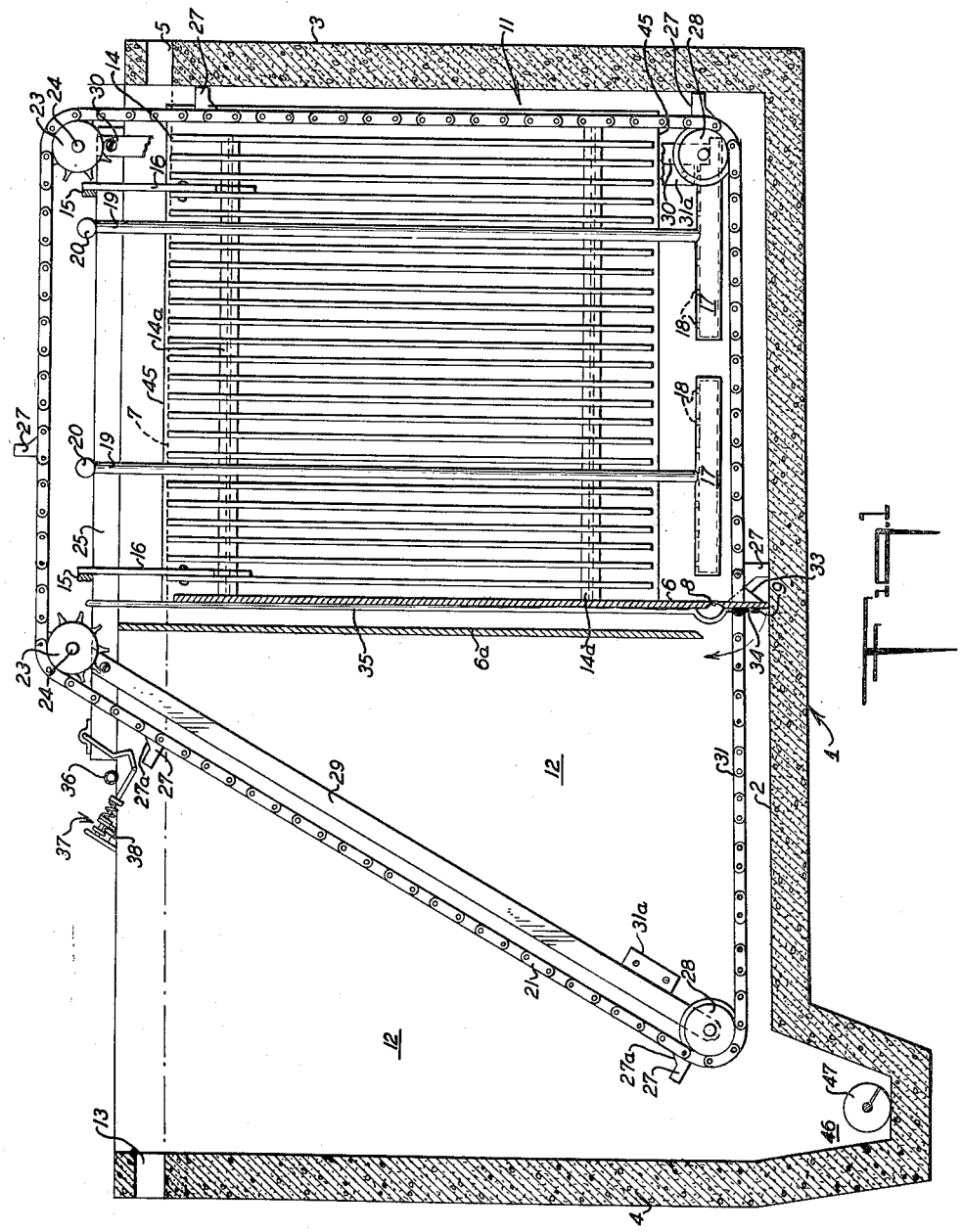

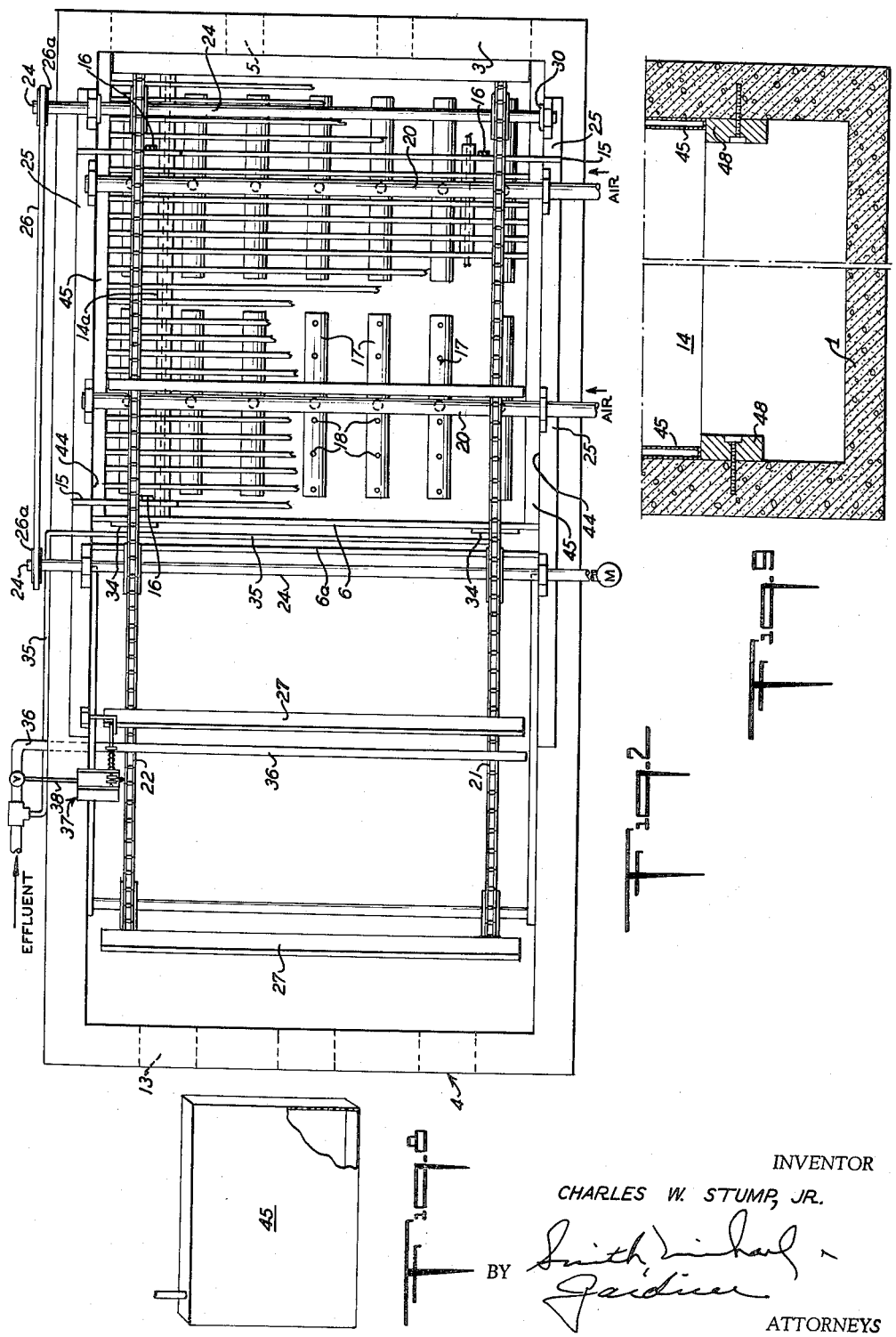

United States Patent Office 3,024,189
Patented Mar. 6, 1962

3,024,189
METHOD OF AND APPARATUS FOR
PURIFYING SEWAGE
Charles W. Stump, Jr., 446 Stratford Ave.,
Hagerstown, Md.
Filed July 30, 1958, Ser. No. 752,059
10 Claims. (Cl. 210—8)

This invention relates to a novel method of and apparatus for the aerobic bacterial purification of sewage.

One object of the invention is to provide, in a sewage treatment plant of the character described, a tank for receiving sewage to be treated, together with partition means for dividing the tank into a sewage treatment chamber and a treated sewage settling chamber, wherein scraper means are arranged to remove settled sludge and solids from both of said chambers and deliver them to a hopper or trough for subsequent removal from the tank.

Another object of the invention is to provide in a sewage treatment tank of the character described, a transverse baffle member in one of said chambers, said baffle member including a door controlled opening through which a conveyor mechanism including an endless chain carrying scraper members may pass.

A further object of the invention is to provide in an apparatus of the character described means for preventing undesirable or premature mixing of liquid from the treatment chamber within the tank with the liquid within the settling chamber of the tank.

Another object of the invention is to preclude flow of liquid directly from the sewage treatment chamber to the sewage settling chamber, by means which simultaneously, effectively seeds the sewage within the treatment chamber.

Another object of the invention is to provide means for effectively sealing the ends of the media plates within the sewage treatment chamber which will permit ready removal of the media plates from the tank when desired.

These and other objects of the invention will become apparent from a consideration of the following specification read in the light of the accompanying drawings where I have shown a preferred embodiment of my invention and wherein, FIG. 1 is a longitudinal, sectional view of the tank showing the apparatus of this invention mounted therein, FIG. 2 is a top plan view of the tank and apparatus shown in FIG. 1, FIG. 3 is an enlarged fragmental detail view of the closure means for the space beneath the baffle member, FIG. 4 is a fragmental detail view, partly in section, showing the arrangement of the spray device associated with a chain aperture in the closure member, FIGS. 5 and 6 are detail views of the spray yoke for the chain aperture in the closure member, FIG. 7 is a detail view showing the automatic control of the chain and scraper washing mechanism, FIG. 8 is a detail view of an inflatable packing member, and FIG. 9 is a sectional detail view showing a modified form of support for the media plates.

In the drawings, in which like reference numerals are used to designate like parts throughout, the main sewage treatment tank is indicated by the reference character 1. The tank may be of concrete or any other suitable construction and is provided with a transversely level but longitudinally sloping bottom wall 2 which as clearly shown in FIG. 1 slopes from the inlet end 3 of the tank to the outlet end 4 thereof. Sewage to be treated may be delivered to the tank through any appropriate inlet means indicated at 5.

Intermediate the ends of the tank is provided a transverse baffle member 6 extending completely across the tank from one side wall to the other thereof, the top edge of the baffle member being slightly below the level of liquid within the tank, which is indicated by the reference character 7. This level may be maintained by proper disposition of the tank inlet and outlet means. The baffle member 6 may be mounted within the tank by any convenient means and in a position such that the lower edge 8 thereof is in spaced relation to the bottom 2 of the tank. The space between the bottom edge 8 of the partition and the bottom of the tank 2 is closed by a movable closure member 9 which may be pivotally connected to the bottom edge of the baffle member 6 by any convenient hinge mechanism shown at 10. It will be understood that the baffle 6 together with the closure member 9 constitute an effective baffle member extending upwardly from the bottom of the tank to a point just below the surface of the liquid in the tank.

A second baffle or partition member 6a extending transversely of the tank from wall to wall, divides the tank 1 into two compartments or chambers, the chamber on the right-hand side of the partition as viewed in FIG. 1 being the sewage treatment chamber and indicated generally by the reference character 11, and the chamber on the left-hand side of the partition member as viewed in FIG. 1 is the sewage settling chamber and is indicated generally by the reference character 12. It will be noted that the partition member 6a extends above the liquid level 7 of the tank and terminates short of the bottom of the tank 2. This arrangement precludes the passage of floating material or surface scum directly into the settling chamber from the treatment chamber. Effluent from the settling chamber 12 passes through outlet passages 13 in the end wall 4 of the tank.

As is well known in aerobic bacterial treatment apparatus for sewage, a bank of media plates such as shown at 14 is mounted within a treatment chamber such as 11. The media plates comprise spaced transversely-extending plate members 14 mounted in any convenient manner from an overhead framework comprising transverse bars 15 carrying depending, supporting members 16 to which the media plates 14 are secured as shown in FIG. 1. The plate members 14 are maintained in properly spaced relation by spacer blocks 14a strung on tie rods as shown, and if desired the depending supporting members 16 may be attached to these tie rods. By this arrangement the entire bank of media plates may be removed as a unit. If desired, however, the plates 14 may be arranged in units of 4 or more plates each, to facilitate the placement and renewal thereof.

The sewage within the treatment chamber 11 is maintained in the desired condition of ebullition or turbulence by feeding air to the bottom of the chamber in a conventional manner and to this end air distributing manifolds 17 are disposed adjacent to the bottom of the tank within the treatment chamber 11. These manifolds 17 on their upper surfaces are provided with air discharge orifices 18 and the manifolds are supplied with air under suitable pressure by an air duct system including vertical pipes 19 and supply conduits 20 connected to any suitable source of air under pressure, not shown. The air supplied to the air distributing manifolds 17 gives rise to upward currents of air between the media plates within the treatment chamber and the oxygen thus supplied supports and enhances the growth of the bacteria which assist in the disintegration of the sewage solids in a well-known manner.

In order to remove the sludge and settled solids on the bottom of the tank beneath the media plates, I provide a conveyor mechanism comprising a pair of endless chain members 21 and 22 which are each arranged to traverse a pair of chain-driving sprocket members 23 secured to transverse shafts 24 which are mounted at the top of the tank by any convenient means, such as the longitudinally-extending supporting beams 25. The shafts 24 may be connected by a belt 26 and pulleys 26a to insure synchronous movement thereof and one of said shafts 24 may be connected to any convenient source of power for driving the conveyor chains, such as an electric motor shown diagrammatically at M.

The conveyor chains 21 and 22 carry transversely disposed scraper elements 27 which are connected to the conveyor chains by suitable brackets or lugs 27b in a manner such that the lower run 31 of the conveyor disposes the scraper elements 27 in scraping relation to the sloping bottom 2 of the tank. In order properly to control the movement of the scraper elements across the bottom of the tank from end to end thereof, suitable guide pulleys 28 are provided for the conveyor chains. Any suitable mounting means may be provided for the conveyor and scraper mechanism such as the frame members shown at 29, 30 and 25 supplemented by suitable wall blocks or brackets 31a shown secured to the inner walls of the tank in position to engage the lower ends of the members 29 and 30 and maintain said members in proper position against the strains imposed thereon by the conveyor chains 21 and 22.

It will noted from FIG. 1 of the drawings that the lower run 31 of the conveyor carries the scrapers 27 beneath the lower edge of the partition member 6a and beneath the lower edge of the baffle member 6 and that th guide pulleys 28 are disposed in position to cause the scraper elements 27 to traverse the bottom of the tank from end to end, including the tank bottom within both the treatment chamber and the settling chamber. With this arrangement it is necessary to provide means for permitting passage of the conveyor chains and scrapers through the opening controlled by the door 9 hinged to the lower edge of the baffle member 6. To this end the pivoted closure member 9 is provided with slots 32 (see FIG. 4), one slot in the path of each of the chains 21 and 22 as they pass beneath the baffle member 6. Thus the chains may pass through these slots without requiring opening of the closure member 9. However, the scrapers 27 extend substantially completely across the tank from chain to chain and thus means must be provided for opening the closure member 9 to permit passage of the scraper elements beneath the baffle 6. The closure member 9, being pivotally connected at its upper edge to the lower edge of the baffle 6, will normally be urged to a closed position under the influence of gravity. If desired, however, any convenient spring means, such as a spring hinge (not shown) may be employed for resiliently urging the closure member 9 into its closed position.

It is desirable to initiate opening of the closure member 9 prior to actual contact thereof by a scraper member. To this end I have shown closure operating means in the form of an elongated, longitudinal lug member 33 carried by the closure member on the chain-approach face 9a thereof, said lug projecting an appreciable distance outwardly of the plane of the baffle 6 to insure opening movement of the closure member 9 when an approaching scraper member 27 reaches a predetermined position well in advance of the plane of the baffle 6. This precludes squeezing of the sludge accumulated in front of the scrapers, up and over the top edge of a scraper as would be occasioned by an arrangement where actual contact between the scraper and the face of the closure member occurred before opening of the closure member started. By providing the lugs 33, as clearly shown in FIG. 3, the opening movement of the closure member is initiated while the scraper member 27 is still appreciably spaced from the closure member. This allows the closure member to open and the scraper member to move all of the accumulated sludge in front of it through the opening beneath the baffle member 6 and into the settling chamber.

While I have shown the lug 33 as being mounted on the closure member 9, in position to be engaged by the overhanging upper edge 27a of the scrapers 27, it is of course possible to accomplish the same result by providing a lug on the forward face of the scrapers, projecting in the direction of chain movement, so that the closure is opened at the proper time to preclude loss of sludge in front of the scraper blade as hereinbefore referred to.

In order to preclude undesirable flow of fluid from the treatment chamber 11 to the settling chamber 12, through the chain openings 32 in the closure member 9, when the latter is in closed position, I provide on the settling-chamber side of the baffle 6 means for precluding such flow and on the contrary to induce liquid flow from the settling-chamber side of the baffle to the treatment chamber side thereof. This means comprises a spray yoke 34 associated with each chain opening 32 as shown in FIGS. 3, 4, 5 and 6. The spray yoke members 34 include generally inverted, U-shaped spray nozzles which embrace the chain slots 32 on the settling-chamber side of the baffle 6. The yoke members 34 may be mounted by any suitable means on the face of the closure member 9 as shown and are supplied with fluid under pressure through flexible conduit means 35. Preferably, the conduits 35 are supplied with effluent liquid from the settling chamber 12 by a conventional pump-supplied conduit system (not shown). The effluent liquid from the settling chamber thus delivered to the spray yokes 34 issues therefrom through generally inclined spray passages 34a arranged to direct the spray fluid into and through the passages 32, and induces a flow of liquid from the settling chamber to the treatment chamber. This not only precludes undesirable flow of liquid from the treatment chamber to the settling chamber but at the same time functions to seed the sewage within the treatment chamber by live bacteria within the effluent liquid sprayed through the chain passages. Also, this spraying of fluid through the chain openings induces a desirable turbulence within the treatment chamber in the region of the chain opening.

It is desirable to maintain those portions of the conveyor chain and scrapers which pass upwardly out of the settling chamber, clean and devoid of any clinging sludge, and to this end I provide washing means for the chains and scrapers in the form of a spray pipe 36 mounted above the settling chamber at the point where the chains and scrapers emerge. The spray pipe 36 extends the full width of the conveyor and effluent from the settling chamber 12 is fed thereto under pressure through a suitable valve mechanism shown generally at 37 and more specifically in FIG. 7. The valve mechanism may include any convenient type of rotary valve actuated by handle member 38 engaged by the spaced shoulder members 39, carried by a longitudinally shiftable operating rod 40 mounted in suitable brackets or guides 41. The rod 40 at its lower end is connected to a pivoted lever 42, said lever having a cam portion 43 disposed in the path of travel of the scrapers 27. The arrangement is such that as the cam 43 of the lever 42 is engaged by the scraper members as they come out of the liquid within the settling chamber, the rod 40 is shifted longitudinally to actuate the valve operating handle 38 to move the valve from a closed to an open position with the result that effluent liquid under pressure is discharged from the spray pipe 36 unto the scraper members 27 and chains 21 and 22. This insures that the upper run of the conveyor chains and scrapers traveling above the tank, is maintained clean and free of sludge.

It is desirable in a sewage treatment apparatus employing media plates such as those shown at 14, that some means be employed for insuring ready removal of the plates from the tank when desired for the purpose of inspecting the tank and/or the apparatus mounted therein. It has been found in the past that the media plates are to some degree absorbent and when mounted with their end edges in close proximity to the side walls of the tank, as they should be to prevent cross circulation between the spaces defined between adjacent pairs of plates, frequently the prolonged submersion of the plates within the tank causes them to swell and jam with undesirable force against the side walls of the tank. This precludes removal of the plates without serious damage thereto, causing unnecessary expense incident to replacement. With this in mind, I provide suitable yielding packing material 45 inserted between the end edges of the media plates 14 and the adjacent side walls of the tank to insure a snug and sealing fit therebetween. The packing material may be of any suitable water-resistant sheet variety to permit its ready removal and thus facilitate withdrawal of the plates without damage. Preferably, the packing material 45 is in the form of hollow, inflatable, bag-like members of rubber, plastic or impregnated fabric, as shown in FIG. 8, so that they may be inserted in place in a deflated condition and then inflated to expand them into snug fitting engagement with the edges of the media plates 14 and the side wall of the tank.

Settled solids from the bottom of the tank underlying the treatment and settling chambers are removed by the scraper elements 27 and deposited in a trough-like structure 46 formed in the bottom of the tank within the settling chamber and such accumulated sludge may be removed from said hopper through any convenient egress opening such as shown at 47 by any convenient pump or conveyor mechanism associated therewith.

While I have referred to the media plates 14 being supported from the top of the tank by the members 15 and 16, it may be desirable in lieu thereof, to provide stringer members 48 secured to the inner side walls of the tank near the bottom thereof as shown in FIG. 9, said stringer members being positioned to support the lower ends of the plates 14 and the lower ends of the packing material 45, with one end of each of said stringers abutting the frame members 30, in lieu of the blocks 31a.

Having thus described my invention it is apparent that I have provided a novel method of and apparatus for purifying sewage by aerobic bacterial treatment thereof. Accumulated solids in both the treatment and settling portions of the apparatus are removed from the bottoms of these chambers by a common conveyor-scraping mechanism which delivers the solids to a hopper or trough in the bottom wall of the tank for ready removal. The scraper mechanism passes beneath a partition or baffle member which divides the tank transversely and novel means are provided for permitting passage of the chains and scrapers beneath the baffle member while precluding undesirable flow of fluids from the treatment chamber to the settling chamber. Novel method of seeding the material within the treatment chamber is provided by projecting effluent from the settling chamber into the treatment chamber through openings provided to permit passage of the chain and scraper mechanism. Portions of the chain and scraper mechanism which lie above the liquid level in the tank are maintained clean and devoid of accumulated sludge by automatically operated washing-spray facilities employing effluent liquid from the settling chamber. Furthermore, the media plates are mounted within the treatment tank by means which insures a snug sealing fit between the ends of these plates and the side walls of the tank while providing for ready removal of the plates either as a unit or in groups, without damage, when desired. This is important since it permits the conveyor supporting framework to be removed from the tank for inspection or repair without dewatering the tank, by opening the chains 21 and 22 and removing the groups of media plates immediately above the guide pulleys 28.

In the accompanying drawings I have illustrated preferred embodiments of my invention but it will be understood by those skilled in the art that various changes may be made in the size and arrangement of parts without departing from the spirit of the invention as defined more clearly in the appended claims.

What I claim is:

1. An aerobic bacterial sewage purification apparatus including a sewage receiving tank having spaced raw sewage inlet and outlet means, a transverse partition member positioned within the tank between the inlet and outlet means thereof and dividing the tank into a treatment chamber and a settling chamber, means supporting the partition member within the tank in an upright position with its lower edge in spaced relation to the bottom of the tank, a closure member for the opening between the bottom of the partition member and the bottom of the tank, means movably mounting said closure member for movement about an axis substantially parallel to the bottom of the partition, a conveyor mechanism mounted within the tank and including an endless chain one run of which passes under the partition member, said chain carrying a sludge scraper member movable along the bottom of the tank, said closure member being provided with an opening through which the chain passes, means to maintain said closure member normally in closed position, said closure member being movable from closed to open position in the direction of chain movement when engaged by said scraper member to permit passage of the scraper member beneath the partition member, means for driving the conveyor mechanism to move the sludge scraper along the bottom of the tank and beneath the partition member, and cooperating means carried by the scraper member and said closure member, said cooperating means comprising a lug carried by one of said members and projecting therefrom towards the other of said members as the scraper member approaches the closure member to initiate opening movement of the closure member when the scraper member is in spaced relation to the closure member on the approach side thereof, said spaced members forming a sludge trap which insures positive transfer of the sludge from the treatment chamber to the settling chamber.

2. The apparatus described in claim 1 wherein spray means are provided on the settling chamber side of the partition in the region of the chain opening in said closure member for directing a stream of fluid through said opening in a direction counter to chain movement therethrough and means for delivering to said spray means fluid under pressure whereby to preclude flow of fluid from the treatment chamber side of the partition through said opening into the settling chamber side of said partition.

3. The apparatus described in claim 2 wherein the spray means is mounted on and is movable with said closure member.

4. The apparatus described in claim 2 where the fluid spray through said chain opening is effluent liquid from the settling chamber side of the partition member.

5. An aerobic bacterial sewage treatment system including a sewage receiving tank, partition means mounted within the tank and providing a treatment chamber and a settling chamber on opposite sides of the portion, a sewage inlet into the treatment chamber and an effluent outlet from the settling chamber, a plurality of media plates suspended in the treatment chamber in spaced relation to the bottom of the tank, means mounting said partition member within said tank with its lower edge in spaced relation to the bottom of the tank, conveyor mechanism mounted within the tank and including an endless chain carrying scraper members, means mounting the conveyor member within the tank so that the lower run of the conveyor chain passes under the partition member and under said media plates and the upper run thereof passes over the top of said partition member with an intermediate portion of the chain being positioned substantially vertically to cause the scrapers mounted thereon to pass substantially vertically downwardly into the tank in the region of the sewage inlet into the treatment chamber thereof, and means for driving the conveyor, said mounting means for the conveyor including a supporting framework having a central horizontal member, a conveyor sprocket supporting arm depending from each end portion thereof, and means removably supporting said framework on the tank with the central horizontal member bridging the partition member and the media plates, and with the lower ends of said sprocket supporting arms disposed adjacent to the bottom of the tank.

6. An aerobic bacterial sewage treatment system comprising a sewage receiving tank, means defining within the tank a treatment chamber and a settling chamber, a sewage inlet into the treatment chamber and an effluent outlet from the settling chamber, conveyor mechanism mounted within the tank and including an endless chain carrying scraper members, means mounting the conveyor member within the tank so that the lower run of the conveyor chain drags the scraper members along the bottom of the tank and the upper run thereof passes over the open top of the tank, means for directing said conveyor upwardly out of the settling chamber and scraper washing means including a spray device positioned above the settling chamber of the tank for directing a washing spray onto the conveyor chain and the scrapers as they emerge from the settling chamber, and cooperating means carried respectively by the conveyor and the washing apparatus for automatically actuating valve means controlling the washing spray to project washing fluid onto the scrapers as the scrapers pass beneath the spray apparatus.

7. An aerobic bacterial sewage treatment system comprising a sewage receiving tank having supported therein a unitary group of media plates arranged in longitudinally spaced relation transversely of the tank with the side edges of the media plates in spaced relation to the adjacent side walls of the tank, sealing means for effectively sealing the side edges of the media plates to the tank walls and to each other comprising yielding packing means substantially coextensive with the wall areas of the tank disposed in opposition to the side edges of said group of media plates disposed in the spaces between the side edges of the plates and the side walls of the tank and snugly engaging in common the side edges of the media plates and the side walls of the tank.

8. The apparatus described in claim 7 wherein said sealing means comprises an expansible, hollow, bag-like member positioned in each of said spaces and being inflatable to urge opposite faces thereof into sealing engagement with the wall of the tank and the ends of several media plates respectively.

9. The sewage treatment system described in claim 7 wherein means are provided for supporting the sealing means independently of the media plates.

10. In an aerobic bacterial sewage treatment system including the delivery of raw sewage liquid to an aerobic treatment zone and moving settled solids from said zone through a submerged opening to a settling zone containing bacterial effluent liquid, the step of forcibly projecting a stream of bacterial effluent liquid from the settling zone through said opening to the treatment zone in counter relation to the direction of movement of solids through said opening, thereby to seed the raw sewage in the treatment zone and to preclude undesirable flow of fluid from the treatment zone to the settling zone through said opening.

References Cited in the file of this patent

UNITED STATES PATENTS

| | | |
|---|---|---|
| 539,568 | Bride | May 21, 1895 |
| 599,957 | Curtis | May 1, 1898 |
| 1,039,316 | Noack | Sept. 24, 1912 |
| 1,399,415 | Taliaferro | Dec. 6, 1921 |
| 1,593,169 | Geiger | July 20, 1926 |
| 1,957,168 | Hyde | May 1, 1934 |
| 2,215,185 | Lund | Sept. 17, 1940 |
| 2,322,017 | Hartman | June 15, 1943 |
| 2,354,609 | Phipps | July 25, 1944 |
| 2,458,163 | Hays | Jan. 4, 1949 |
| 2,574,058 | Porter | Nov. 6, 1951 |
| 2,616,848 | Griffith | Nov. 4, 1952 |
| 2,633,992 | Hock | Apr. 7, 1953 |
| 2,713,026 | Kelly et al. | July 12, 1955 |
| 2,728,116 | Westlund | Dec. 27, 1955 |
| 2,813,074 | Banks et al. | Nov. 12, 1957 |
| 2,825,941 | Lux et al. | Mar. 11, 1958 |